US006925058B2

(12) United States Patent
Jones et al.

(10) Patent No.: US 6,925,058 B2
(45) Date of Patent: Aug. 2, 2005

(54) CREDIT MANAGEMENT FOR DATA FLOW BETWEEN TWO NETWORKS

(75) Inventors: Loren M. Jones, San Jose, CA (US); Sanford L. Helton, San Jose, CA (US); Allison Parson, Los Gatos, CA (US); Rendell K. Fong, San Jose, CA (US); Edward G. Carmona, Pleasanton, CA (US); Emmanuel W. Jee, San Jose, CA (US)

(73) Assignee: San Valley Systems, Inc., San Jose, CA (US)

( * ) Notice: Subject to any disclaimer, the term of this patent is extended or adjusted under 35 U.S.C. 154(b) by 886 days.

(21) Appl. No.: 09/811,344

(22) Filed: Mar. 16, 2001

(65) Prior Publication Data

US 2002/0143983 A1 Oct. 3, 2002

(51) Int. Cl.[7] .............................. H04J 1/16; H04L 1/00
(52) U.S. Cl. ...................... 370/235; 370/396; 709/238
(58) Field of Search ................................ 370/235, 396; 709/226, 238; 340/401, 403; 711/11

(56) References Cited

U.S. PATENT DOCUMENTS

| | | | | |
|---|---|---|---|---|
| 5,469,545 A | * | 11/1995 | Vanbuskirk et al. | 709/234 |
| 5,592,472 A | * | 1/1997 | Grant et al. | 370/351 |
| 5,600,652 A | * | 2/1997 | Kreamer et al. | 370/396 |
| 5,694,615 A | * | 12/1997 | Thapar et al. | 710/2 |
| 5,822,540 A | * | 10/1998 | Caldara et al. | 709/236 |
| 5,841,971 A | * | 11/1998 | Longginou et al. | 709/200 |
| 5,956,322 A | * | 9/1999 | Charny | 370/236.1 |
| 6,084,856 A | | 7/2000 | Simmons et al. | 370/235 |
| 6,335,803 B1 | | 1/2002 | Chimura et al. | 358/434 |

* cited by examiner

Primary Examiner—Zarni Maung
Assistant Examiner—Khanh Quang Dinh
(74) Attorney, Agent, or Firm—Pillsbury Winthrop Shaw Pittman LLP

(57) ABSTRACT

A method for communicating between a first device and a second device, wherein the communication occurs across a fabric and the first device is coupled to the fabric by a first gateway and the second device is coupled to the fabric by a second gateway. The method includes adjusting, at the first gateway, upon receipt of a first device readiness signal a first device readiness indicator to indicate an increase in a number of frames the first device is ready to accept, and sending, from the first gateway to the second gateway, a first gateway readiness signal, the first gateway readiness signal indicative of an increase in a number of frames the first gateway is ready to accept. The method then includes: receiving, at an input buffer of the first gateway from the second gateway, a first device frame; sending, from the first gateway to the first device, the first device frame when the first device readiness indicator indicates that the first device is ready to accept the first device frame; and adjusting, at the first gateway, the first device readiness indicator upon sending the first device frame to the first device to indicate a decrease in the number of frames the first device is ready to accept.

37 Claims, 4 Drawing Sheets

CREDIT MANAGEMENT FOR DATA FLOW BETWEEN TWO NETWORKS

FIELD

The present invention pertains to the field of storage area networks. More particularly, the present invention relates methods and systems for communicating with and between storage area networks.

BACKGROUND

Fibre Channel is a computer communications protocol designed to meet the many requirements related to the ever increasing demand for high performance information transfer. The Fibre Channel protocol is sometimes referred to in the literature as Fiber Channel; the variation is due to differences in spelling between American English and British English. Fibre Channel combines the benefits of both channel and network technology and also provides for flexible topologies, connectivity over several kilometers (not to exceed generally 10 kilometers (km)), and support for multiple relatively high data rates, media types, and connectors. Fibre Channel has become relatively popular for connecting multiple storage devices together to form a storage area network (SAN). The popularity is partly due to the fact that once a channel between two devices is set up very little decision making is needed, allowing for a high speed, hardware intensive environment.

Increasingly, however, SANs are becoming geographically dispersed. This dispersion is due to many factors: mergers and acquisitions of companies located nationally and internationally; desire to provide off-site storage; and storage replication, among other factors. Due to the upper limit on the distance of about 10 km between two devices on a Fibre Channel network, it is impracticable to interconnect two storage area networks that are separated by a distance greater than 10 km using Fibre Channel.

To allow communication between two FC enabled SANs, SANs have been interconnected by a non-Fibre Channel network or fabric (or point-to-point interconnect) that supports communication over large distances (greater than 10 km). Unfortunately, a non-FC network or interconnect may introduce a substantial delay, leading to a throughput between the two SANs that is less than the actual capacity or bandwidth of the two SANs.

FIG. 1 illustrates a block diagram of an inter-network including two FC enabled devices, and a network or fabric. FC devices communicate by sending RRDY signals to each other which indicate that one device is ready to receive a frame of data from the other device. A RRDY has to be received by the other device before the other device can transmit a frame of data. For purposes of illustration, device 110 and device 130 have a communication link or channel set up between them which is ready for the transfer of data from device 130 to device 110. Device 110 sends a RRDY to device 130. Since devices 110 and 130 are coupled by network 210, which causes a delay, the RRDY arrives at device 130 at a time Δt after it was transmitted. Device 130 sends a frame of data to device 110 after it receives the RRDY. It also takes a time of Δt for the frame to arrive at device 110. If there are N bits in the frame, the effective transmission rate for the frame is N/(2Δt). Assuming that Δt is larger than the time it takes to transmit the bits of a frame (δt), the effective transmission rate or throughput of communications link is lower than the actual generation or transmission rate of the frame (N/δt). The frame of data, even though it was generated at a relatively high data rate (actual transmission rate), has an effective transmission rate that is lower than the actual transmission rate.

Several solutions have been proposed for increasing the effective transmission rate. However, these solutions may cause dropped frames due to excessive data flow. Discarded or dropped frames have to be sent again which means that the effective bandwidth is less than what it could be if frames were not discarded or dropped.

As described above, existing solutions are not capable of providing efficient communication between geographically dispersed SANs. Consequently, it is desirable to interconnect geographically dispersed Fibre Channel enabled SANs in a manner that allows efficient communication.

SUMMARY

A method for communicating between a first device and a second device, wherein the communication occurs across a fabric and the first device is coupled to the fabric by a first gateway and the second device is coupled to the fabric by a second gateway, is described. The method includes adjusting, at the first gateway, upon receipt of a first device readiness signal a first device readiness indicator to indicate an increase in a number of frames the first device is ready to accept, and sending, from the first gateway to the second gateway, a first gateway readiness signal, the first gateway readiness signal indicative of an increase in a number of frames the first gateway is ready to accept. The method then includes: receiving, at an input buffer of the first gateway from the second gateway, a first device frame; sending, from the first gateway to the first device, the first device frame when the first device readiness indicator indicates that the first device is ready to accept the first device frame; and adjusting, at the first gateway, the first device readiness indicator upon sending the first device frame to the first device to indicate a decrease in the number of frames the first device is ready to accept.

BRIEF DESCRIPTION OF THE DRAWINGS

The present invention is illustrated by way of example, and not limitation, in the figures of the accompanying drawings in which like references denote similar elements, and in which.

DETAILED DESCRIPTION

A method and apparatus for communicating between two Fibre Channel enabled devices is described, where the communication occurs across a fabric that operates in accordance with a protocol different from the protocol of the two Fibre Channel enabled devices. In the following description, for purposes of explanation, numerous specific details are set forth in order to provide a thorough understanding of the present invention. It will be evident, however, to one skilled in the art that the present invention may be practiced in a variety of communication systems, especially Fibre Channel to Gigabit Ethernet systems, without these specific details. In other instances, well known operations, steps, functions and devices are not shown in order to avoid obscuring the invention.

Parts of the description will be presented using terminology commonly employed by those skilled in the art to convey the substance of their work to others skilled in the art, such as routers, protocols, gateways, fabric, networks, storage area networks, and so forth. Also parts of the description will also be presented in terms of operations performed through the execution of programming instructions or initiating the functionality of some electrical component(s) or circuitry, using terms such as, performing, sending, processing, packaging, scheduling, transmitting, configuring, and so on. As well understood by those skilled in the art, these operations take the form of electrical or magnetic or optical signals capable of being stored, transferred, combined, and otherwise manipulated through electrical components.

Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "an alternative embodiment," or an "alternate embodiment" does not necessarily refer to the same embodiment, although it may.

Figure 2:
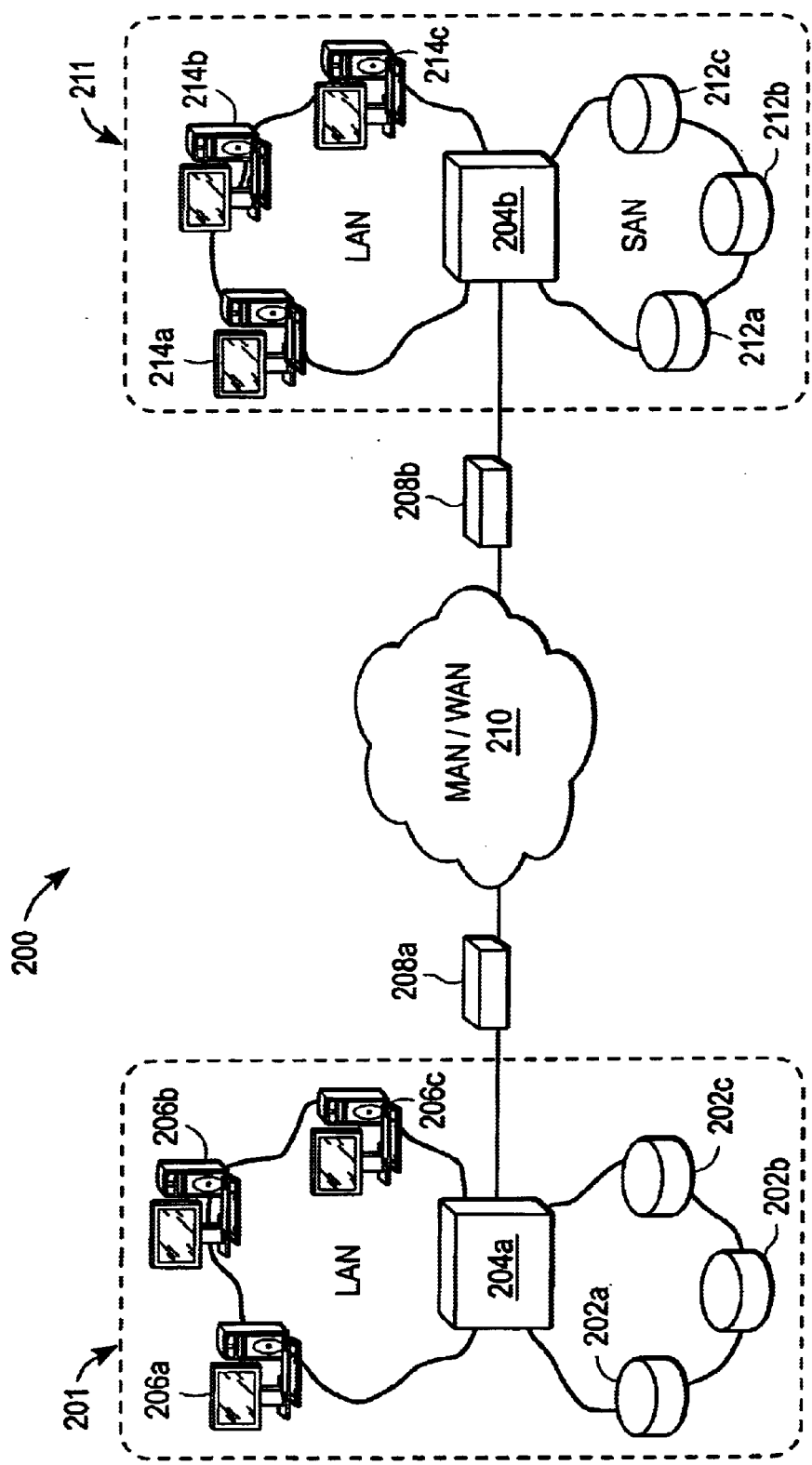
FIG. 2 illustrates a block diagram of an inter-network including fabric, gateways, and storage area networks (SANs)

FIG. 2 illustrates a block diagram of an inter-network 200 including fabric 210, gateways 208a and 208b, and storage area networks (SANs) 201 and 211. In one embodiment in accordance with the present invention, storage area networks 201 and 211 operate in accordance with the Fibre Channel (FC) computer communications protocol (FC protocol) as described in American National Standards Institute (ANSI) X3.-240-1994, Fibre Channel Physical and Signaling Interface specification (FC-PH). Each of the networks 201 and 211 can be a combination of storage devices, such as disk drives 202a, 202b, 202c, 212a, 212b, 212c, and servers 204a and 204b. Fabric 210 comprises a network operating in accordance with the Gigabit Ethernet protocol as described in the following standards: IEEE Standard 802.3ad-2000 for Information Technology—Local and Metropolitan Area Networks—Part 3: Carrier Sense Multiple Access with Collision Detection (CSMA/CD) Access Method and Physical Layer Specifications—Aggregation of Multiple Link Segments; IEEE Standard 802.3ab-1999 for Information Technology—Telecommunications and information exchange between systems—Local and Metropolitan Area Networks—Part 3: Carrier Sense Multiple Access with Collision Detection (CSMA/CD) Access Method and Physical Layer Specifications—Physical Layer Parameters and Specifications for 1000 Mb/s Operation over 4 pair of Category 5 Balanced Copper Cabling, Type 1000 BASE-T; Computer/Local & Metropolitan Area Networks; IEEE Standard 802.3ac-1998 for Information technology—Telecommunications and information exchange between systems—Local and metropolitan area networks—Specific requirements Part 3: Carrier sense multiple access with collision detection (CSMA/CD) frame extensions for Virtual Bridged Local Area Networks (VLAN) tagging on 802.3 networks. Fabric 210 may include multiple local networks, bridges, and routers in a wide area network (WAN) or a metropolitan area network (MAN). The manner of operation of fabric 210 is not described here because it understood well by those of ordinary skill in the art.

In one embodiment, SANs 201 and 211 operate at a rate of 1.0625 gigabits/sec and fabric 210 operates at a rate of 1.25 gigabits/sec. In alternative embodiments, SANs 201 and 211, and fabric 210 may operate at other rates.

Even though SANs 201 and 211, on the one hand, and fabric 210, on the other hand, use different protocols, devices in SANs 201 and 211 can communicate with or transfer data between each other because they are coupled to fabric 210 by gateways 208a and 208b, respectively. Gateways 208a and 208b take FC frames or signals (primitives or primitive sequences) received from networks 201 and 211, respectively, and process them to generate ethernet packets suitable for transmission on fabric 210. Additionally, gateways 208a and 208b take ethernet packets received from fabric 210 and intended for either of SANs 201 and 211, respectively, and process them to generate FC frames or signals suitable for transmission over SANs 201 and 211, respectively. Gateways 208a and 208b allow network 201 and 211, respectively, to seem to be coupled by a FC fabric instead of an ethernet fabric. Accordingly, a device on network 201 is able to communicate with a device on network 211, and vice versa, through the gateways and fabric, using FC signals. The operation of gateways 208a and 208b with respect to coupling an FC device to a non-FC network is the subject of a co-pending application filed on Mar. 16, 2001 with Ser. No. 09/811,155.

Figure 3:
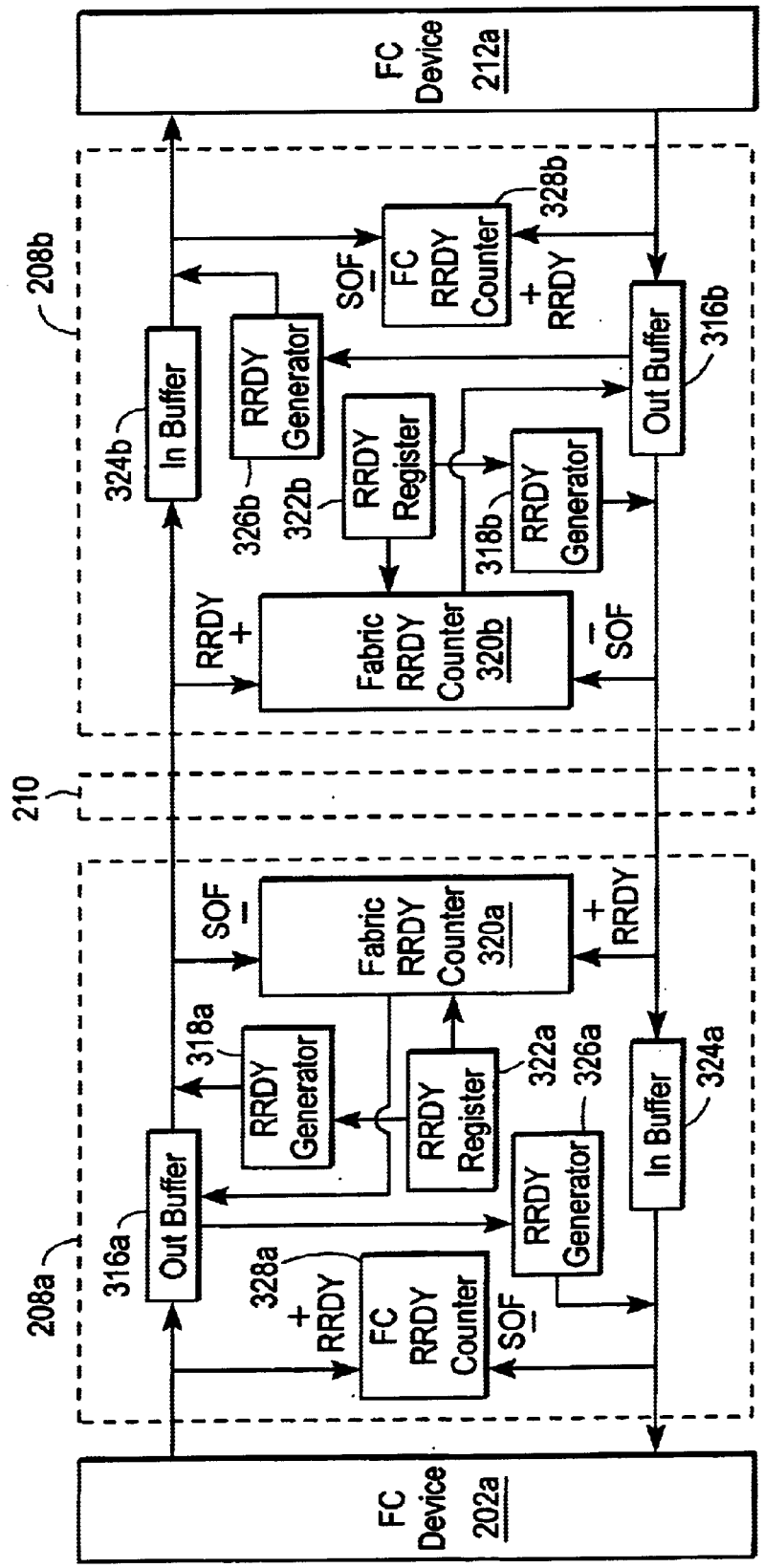
FIG. 3 illustrates FC devices, gateways, along with fabric according to one embodiment.

FIG. 3 illustrates devices 202a and 212a and gateways 208a and 208b in greater detail along with fabric 210. Devices 202a and 212a are separated by a large distance which can exceed 10 kilometers. Since devices 202a and 212a are separated by a large distance there is a delay in transmitting information between them. The delay can be much larger than the time it takes to transmit a frame of data. The delay makes FC networks or FC-to-non-FC-to-FC networks inefficient. The inefficiency results from the time it takes to receive data after an indication indicating readiness to receive data (RRDY) is sent, or a similar buffer-to-buffer primitive.

Instead of having an FC device wait for an RRDY to be received from another device before data can be sent, the present invention allows an FC device to transmit data without waiting to receive an RRDY from another FC device. Allowing an FC device to transmit data without waiting to receive an RRDY from another FC device decreases the effect of the delay, improving performance. The present invention decreases the effect of the delay by dividing the link between devices 202a and 212a into three sub-links and placing buffers in the intermediate link. The buffers are larger than the buffers in devices 202a and 212a and can be sized depending upon the distance, or delay, between the two devices. The first sub-link is between device 202a and gateway 208a. The second sub-link is between gateway 208a and gateway 208b. The third sub-link is between gateway 208b and device 212a. The division of the link and the buffers allows the devices to communicate with the nearest gateway instead of each other, sidestepping the delay imposed by network 210. For example, device 212a receives an RRDY from gateway 208b'generator 326b, rather than device 202a, each time a frame leaves buffer 316b. An RRDY is sent from gateway 208b irrespective of whether there is space in device 202a to receive a frame. A frame will leave buffer 316b if there is space in buffer 324a as indicated by counter 320b, rather than if there is buffer space (not shown) in device 202a. Since buffer 324a is larger than the buffer space of device 202a, a relatively large number of frames can be transferred from device 212a to buffer 324a. A tight loop that does not depend on the delay due to network 210 is set up between device 212a, buffer 316b, counter 320b and generator 326b. In a relatively short time, buffer 324a is filled with frames for transfer to device 202a.

A similar improvement occurs in the link between gateway 208a and device 202a. Instead of waiting for a RRDY to arrive at device 212a and for a frame to travel back to device 202a, device 202a receives a frame soon after an RRDY is received at gateway 208a. Since the distance between gateway 208a and device 202a is relatively small, buffer 324a can be emptied rather quickly.

The operation of the devices and the gateways after the establishment of a communications link across fabric 210 will be described in greater detail below. The description is with respect to transfer of data from device 212a to device 202a. It should be appreciated that the transfer of data from device 202a to 212a is similar and need not be described here.

Upon establishment of a communications link, generator 318a retrieves the value stored in RRDY register 322a. Register 322a stores the number of RRDYs that generator 318a transmits upon the establishment of a communications link (link reset). In one embodiment, register 322a stores an integer value N. The value of N is a design factor which can vary according to design considerations such as the size of the buffers 324a and 324b. In one embodiment, buffers 324a and 324b are sized to contain twice the number of frames that can occupy the link between gateways 208a and 2080b. The number of frames that can occupy the link between gateway 208a and 208b is equal to the time, Dt, it takes for a frame to travel from gateway 208a to gateway 208b divided by the time, dt, it takes for a frame of the longest permissible length to be transmitted from gateway 208a.

Upon link reset, then, generator 318a transmits N RRDYs to gateway 208b, indicating to gateway 208b that it is ready to accept up to N frames. At gateway 208b, fabric RRDY counter 320b loads the value in register 322b. In one embodiment, register 322b also stores N. As each of the N RRDYs is received at gateway 208b, counter 320b is incremented. Upon link reset, device 202a also transmits RRDYs to gateway 208b. The number of RRDYs that device 202a transmits is dependent upon the credit model that devices 202a and 212a negotiated during the link setup. Assume for purposes of illustration that devices 202a and 212a negotiated an n credit model. Accordingly, device 202a transmits n RRDYs to gateway 208b. As each of the n RRDYs passes through gateway 208a to device 212a counter 328a is incremented such that it stores n. At gateway 208b, counter 320b is incremented by n. In total, N+n RRDYs are sent to gateway 208b upon link reset.

Upon link reset, RRDY generator 326b sends n RRDYs to device 212a. Device 212a sends n frames to buffer 316b. Buffer 316b transmits the first of the n frames to gateway 208a if counter 320b is greater than zero. Since counter 320b holds the value 2N+n, buffer 316b transmits the first of the n frames to gateway 208a. When the first of the n frames leaves buffer 316b, generator 326b sends an RRDY to device 212a. Additionally, when the first of the n frames leaves buffer 316b, counter 320b is decremented. The basic rule for generator 326b is to unconditionally send a RRDY to device 212a whenever a frame leaves buffer 316b. The basic rule for buffer 316b is to send a frame out only if counter 320b is greater than zero.

The n frames travel to buffer 324a. Buffer 324a sends frames to device 202a only if counter 328a is greater than zero. Since counter 328a is equal to n, buffer 324a sends the first of the n frames to device 202a. Counter 328a is decremented each time a frame leaves buffer 324a and is incremented each time a RRDY is received from device 202a. Since counter 328a stores n-1, the second of the of n frames is sent to device 202a, causing counter 328a to decrement to zero. Device 202a processes each of the frames that it receives, and as space becomes available in its buffer, it sends an RRDY to device 212a via gateway 208a. When each RRDY is received at gateway 208a, counter 328a is incremented and another frame can leave buffer 324a. When the RRDY is received at gateway 208b counter 220b is incremented.

The size of buffers 324a and 324b is described below. During the transfer of data between device 202a and device 212a, device 202a may be unable for some time to receive more frames. When this event happens, frames will start to fill up buffer 324a. The size of buffer 324a needs to be set so that frames will not be dropped due to insufficient capacity. The size of buffer 324a is a function of the starting value of counter 320b on link reset (N1), the number of RRDYs sent on link reset to gateway 208b from gateway 208a (N2), and the maximum number of RRDYs (n) of the credit model negotiated between devices 202a and 212a. In such an embodiment, buffer 324a would have to be able to store $N1+N2+n_{max}$ frames; in case, device 202a is able to accept frames from buffer 324a only after $N1+N2+n_{max}$ frames have been received at buffer 324a. If it were certain that device 202a could accept frames from buffer 324a as they were arriving, buffer 324a could be smaller than $N1+N2+n_{max}$ frames in size. Since, however, it is not certain that device 202a can accept frames before the $N1+N2+n_{max}$ frames have arrived, buffer 324a needs to be sized to hold $N1+N2+n_{max}$ frames. $N1+N2+n_{max}$ does not have to be a function of Dt/dt, but it may. In one embodiment N1=N2=N and buffer 324a holds $2N+n_{max}$ frames, where N>=1 and $n_{max}$>=0. In an alternative embodiment, N1=0, N2=N, and buffer 324a holds $N+n_{max}$ frames, where N>=1 and n>=0. In yet another alternative embodiment, N1=N, N2=0, and buffer 324a accepts $N+n_{max}$ frames, where N>=1 and n>=0. Since the size of frames sent by device 212a cannot be known beforehand and may vary during transmission, in one embodiment, frames are assumed to have the largest size permissible.

While in one embodiment there is a generator 318a which transmits N RRDYs to gateway 208b, an alternative embodiment may not include a generator. Rather, upon link reset counter 320b in gateway 208b loads N from RRDY register 322b. In another embodiment, upon link reset, counter 320b loads N from register 322b and counter 320b is incremented by a stream of N RRDYs transmitted by generator 318a and the n RRDYs transmitted by device 202a. In yet another embodiment, there may be no RRDY register and generator 318a sends N RRDYs to gateway 208b and counter 320b does not load a value from a RRDY register.

Figure 4:
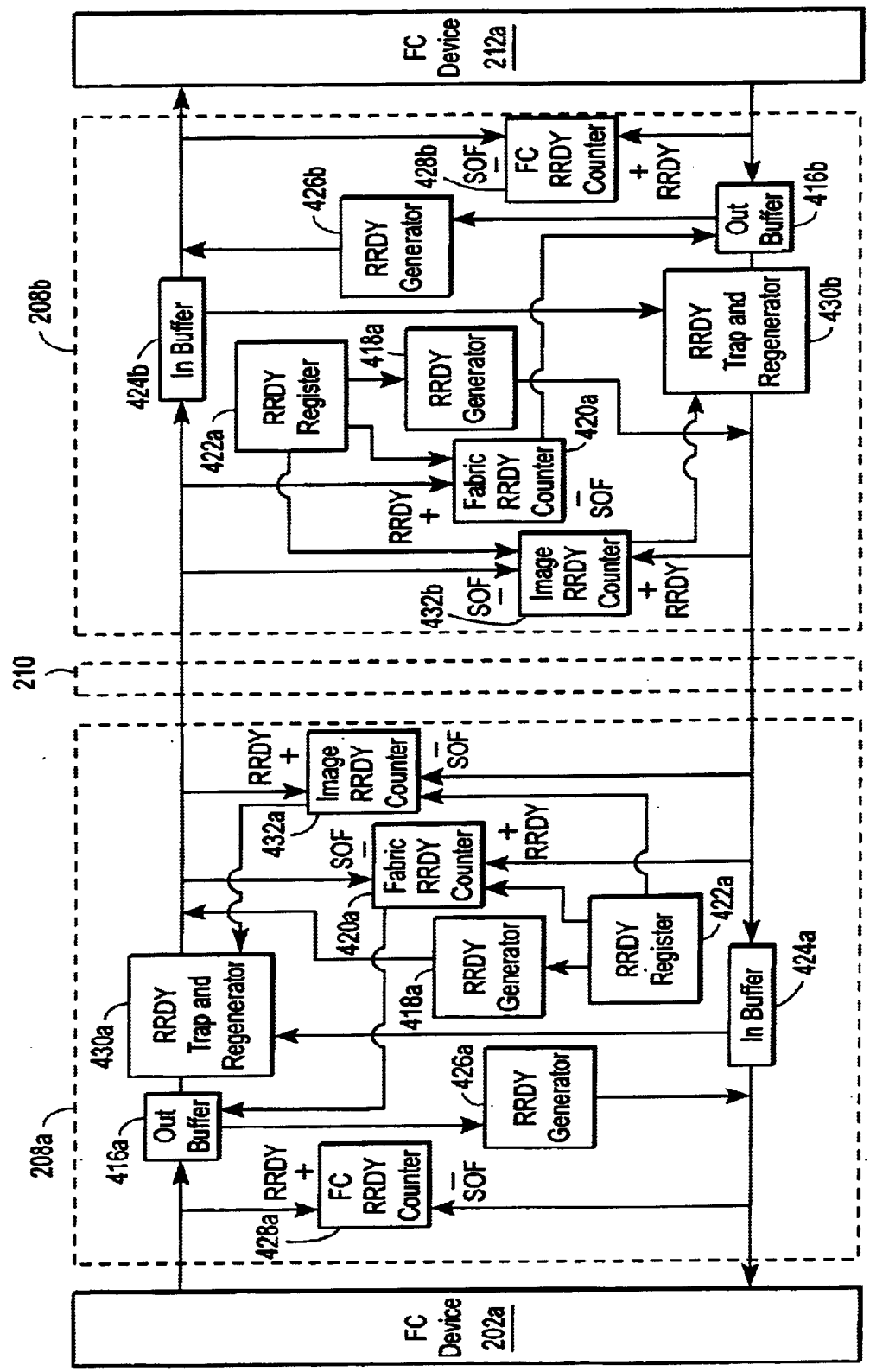
FIG. 4 illustrates, in an alternative embodiment, FC devices, gateways, and fabric 210.

FIG. 4 illustrates, in an alternative embodiment, devices 202a and 212a and gateways 408a and 408b along with fabric 210. Gateways 408a and 408b are alternative gateways for gateways 208a and 208b of FIG. 2. For ease of illustration, gateway 408a is described below. However, it should be appreciated that gateway 408b operates in a similar manner.

Gateway 408a operates in a manner generally similar to gateway 208a. Part of the difference in operation is due to the ability of gateway 408a to monitor the free space available in buffer 424a and the number of frames that are expected to be received at gateway 408a. If the free space is greater than the space which would be occupied by the frames that are expected, an RRDY is sent to gateway 408b every time a frame is received at buffer 424a of gateway 408a. In this manner, the free space in buffer 424a will eventually be substantially equivalent to the space that would be occupied by the expected frames. By making the free space in buffer 424a equivalent to the frames that are expected, efficient communication across fabric 210 can be achieved. In an alternative embodiment, an RRDY is sent to gateway 408b every time a frame leaves buffer 424a and the free space is greater than the space which would be occupied by the frames that are expected.

Assume that a communications link has been set up between devices 202a and 212b and that the devices have negotiated a n credit model. Also assume that register 422a and 422b each stores the value N. Upon link reset, generator 418a retrieves N from register 422a and sends N RRDYs to gateway 208b. Counter 432a also retrieves N from register 422a. Device 202a sends n RRDYs to gateway 208b. The N and n RRDYs increment counter 432a such that it stores the value 2N+n. Counter 432a stores the number of frames that are expected to be received from gateway 208b. Each time one of the expected frames arrives at gateway 408a, counter 432a is decremented. Counter 432a gives an indication of the space that needs to be available in buffer 424a. Buffer 424a needs to be able to store the number of frames that are expected to be received, in case device 202a is not able to accept any frames until after all the 2N+n frames have been received. Buffer 424a needs to be able to store at least 2N+n frames, for the largest values that N and n can have in a system and for the largest permissible size for a frame ($F_{fs}$). In one embodiment, buffer 424a stores 3N frames. In constructing buffer 424a, each frame is assumed to be $F_{fs}$ in size. For example, if $F_{fs}$ is 2148 and N=100, buffer 424a would store 3(100)(2148 bytes)=644,400 bytes.

Since size of buffer 424a (3N) is larger than the size of 2N+n frames, buffer 424a has some free space at link reset. Additionally, in practice, buffer 424a may receive frames that are smaller than $F_{fs}$. Over time, buffer 424a will also have free space due to receipt of frames that are less than $F_{fs}$ taking up less than the space allocated to them. It is desirable to 'use up' the free space by sending out additional RRDYs to gateway 408b. By sending out additional RRDYs the frames that are expected to be received from gateway 408b increases and free space decreases. When the free space less $F_{fs}$ is larger than or equal to the expected frame space, RRDY trap and regenerator 430a sends an RRDY to gateway 408b whenever a frame arrives at buffer 424a. When the free space less $F_{fs}$ is smaller than the expected frame space, regenerator 430a stores an RRDY for sending to gateway 408b when certain conditions are satisfied. For example, in one embodiment, when a frame leaves buffer 424a and the free space less $F_{fs}$ is larger than or equal to the expected frame space, an RRDY that had been stored in regenerator 430a is sent to gateway 408b.

While according to an embodiment network 201 and 211 operated in accordance with American National Standards Institute (ANSI) X3.-240-1994, Fibre Channel Physical and Signaling Interface specification, for the Fibre Channel protocol (also known as FC-PH), it should be appreciated that SANs 201 and 211 are not limited to operation in accordance with FC-PH. Rather, in alternative embodiments in accordance with the present invention, networks 201 and 211 can operate in accordance with other Fibre Channel specifications or modifications to FC-PH, including the following: ANSI X3.297-997, Fibre Channel Physical and Signaling Interface-2 (FC-PH-2), and Project 119-D, Fibre Channel Physical and Signaling Interface-3 (FC-PH-3). All the various Fibre Channel protocols will be collectively referred to as FC. While according to an embodiment fabric 210 operates in accordance with the Gigabit Ethernet protocol, it should be appreciated that in alternative embodiments in accordance with the present invention, fabric 210 operates in accordance with Asynchronous Transfer Mode (ATM), frame relay, Synchronous Optical Network (SONET), and Internet Protocol (IP) and other communication protocols. While in one embodiment fabric 210 is a network of multiple routers and other devices, in an alternative embodiment fabric 210 can be as simple as a single router/bridge which operates in accordance with a protocol different from the protocol of SANs 201 and 211.

Figure 1:
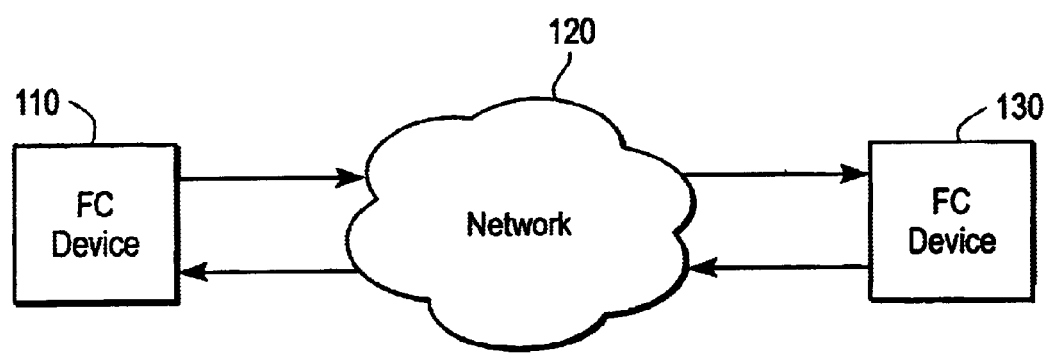
FIG. 1 illustrates a block diagram of an inter-network including fabric, gateways, and storage area networks (SANs)

While according to one embodiment networks 201 and 211 have the topology shown in FIG. 1, it should be apparent that in alternative embodiments in accordance with the present inventions either or both of networks 201 and 211 can have a different topology from that shown in FIG. 1. Furthermore, the exact nature of the topologies, data rates, media types and connectors is not particularly crucial to the practice of the present invention. While in one embodiment SANs 201 and 211 are combinations of storage devices, it should be appreciated that in alternative embodiments SANS 201 and 211 can include other data sources such as tape drives, compact disk (CD) drives, computers, digital imaging or sound equipment. Furthermore, in alternative embodiments SANs 201 and 211 can consist of only one data source.

Thus, a method and apparatus for communicating between two FC enabled devices that are coupled by a fabric has been described. Although the present invention has been described with reference to specific exemplary embodiments, it will be evident to one of ordinary skill in the art that various modifications and changes may be made to these embodiments without departing from the broader spirit and scope of the invention as set forth in the claims. Accordingly, the specification and drawings are to be regarded in an illustrative rather than a restrictive sense.

We claim:

1. A method for communicating between a first device and a second device, wherein the communication occurs across a fabric and the first device is coupled to the fabric by a first gateway and the second device is coupled to the fabric by a second gateway, the method comprising:
   adjusting, at the first gateway, upon receipt of a first device readiness signal a first device readiness indicator to indicate an increase in a number of frames the first device is ready to accept;
   sending, from the first gateway to the second gateway, a first gateway readiness signal, the first gateway readiness signal indicative of an increase in a number of frames the first gateway is ready to accept;
   receiving, at an input buffer of the first gateway from the second gateway, a first device frame;
   sending, from the first gateway to the first device, the first device frame when the first device readiness indicator indicates that the first device is ready to accept the first device frame; and
   adjusting, at the first gateway, the first device readiness indicator upon sending the first device frame to the first device to indicate a decrease in the number of frames the first device is ready to accept.

2. The method of claim 1, further comprising forwarding the received first device readiness signal to the second gateway.

3. The method of claim 1, wherein adjusting the first device readiness indicator to indicate an increase includes incrementing a counter.

4. The method of claim 1, wherein adjusting the first device indicator to indicate a decrease includes decrementing a counter.

5. The method of claim 1, wherein the first gateway readiness signal is sent to the second gateway without waiting for receipt of the first device readiness signal.

6. The method of claim 1, further comprising:
   retrieving a value from a readiness signal register; and
   sending from the first gateway to the second gateway a number of first gateway readiness signals based on the value retrieved.

7. The method of claim 1, further comprising:
   receiving, at the first gateway, a second gateway readiness signal indicative of an increase in a number of frames the second gateway is ready to accept; and
   adjusting a second gateway readiness indicator upon receipt of the second gateway readiness signal to indicate an increase in the number of frames the second gateway is ready to accept.

8. The method of claim 7, further comprising, adjusting, at the first gateway, the second gateway readiness indicator, upon sending to the second gateway a second device frame received from the first device, to indicate a decrease in the number of frames the second gateway is ready to accept.

9. A method for communicating between a first communication device and a second communication device, wherein the communication occurs across a fabric and the first device is coupled to the fabric by a first gateway and the second device is coupled to the fabric by a second gateway, the method comprising, the method comprising:
   sending, from the first gateway to the first device, a readiness signal;
   receiving, at the first gateway from the first device, a second device frame in response to the readiness signal;
   adjusting, at the first gateway, a second gateway readiness indicator, upon receipt of a second gateway readiness signal from the second gateway, to indicate an increase in a number of frames the second gateway is ready to accept;
   sending, from the first gateway to the second gateway, the second device frame when the second gateway readiness indicator indicates that the second gateway is ready to accept the second device frame;
   adjusting, at the first gateway, the second gateway readiness indicator, upon sending one the second device frame, to indicate a decrease in the number of frames the second gateway is ready to accept.

10. The method of claim 9, further comprising:
    storing, at the second gateway, a value indicative of a number of second device frames that the second gateway will accept;
    loading the value into the second gateway readiness indicator.

11. The method of claim 9, wherein adjusting the second gateway readiness indicator to indicate an increase includes incrementing a counter.

12. The method of claim 9, wherein adjusting the second gateway readiness indicator to indicate a decrease includes decrementing a counter.

13. A method for communicating between a first communication device and a second communication device, wherein the communication occurs across a fabric and the first device is coupled to the fabric by a first gateway and the second device is coupled to the fabric by a second gateway, the method comprising:
    adjusting, at a first gateway, a first device readiness indicator, upon receipt of a first device readiness signal, to indicate an increase in a number of frames the first device is ready to accept;
    receiving, at an input buffer of the first gateway from the second gateway, a first device frame;
    sending, from the input buffer of the first gateway, the first device frame when the first device readiness indicator indicates that the first device is ready to accept the first device frame;
    sending, from the first gateway to the second gateway, a readiness signal when free space in the input buffer is above a threshold;
    adjusting, at the first gateway, a first gateway readiness indicator, when the first device frame enters the input buffer, to indicate a decrease in a number of frames the first gateway is ready to accept; and
    adjusting the first device readiness indicator upon the sending the first device frame to the first device to indicate a decrease in the number of frames the first device is ready to accept.

14. The method of claim 13, further comprising storing a readiness signal for later transmittal to the second gateway if free space in the input buffer is less than a threshold and the first device frame leaves the input buffer.

15. The method of claim 13, further comprising:
sending, from the first gateway to the second gateway, a first gateway readiness signal indicative of an increase in a number of frames the first gateway is ready to accept; and
adjusting the first gateway readiness indicator when the first gateway readiness signal is sent to the second gateway to indicate an increase in the number of frames the first gateway is ready to accept.

16. The method of claim 13, wherein adjusting the first gateway readiness indicator to indicate an increase includes incrementing a counter.

17. The method of claim 13, further comprising:
retrieving a value from a readiness signal register; and
sending from the first gateway to the second gateway a number of first gateway readiness signals based on the value retrieved.

18. The method of claim 13, wherein adjusting the first gateway readiness indicator to indicate a decrease includes decrementing a counter.

19. The method of claim 13, wherein the readiness signal is sent to the second gateway if free space in the input buffer is above a threshold and the first device frame enters the input buffer.

20. A first gateway for communication between a first device and a second device, the first gateway coupling the first device to an intermediate network to which the second device is coupled by way of a second gateway, the first gateway comprising:
a first device readiness indicator that is to be adjusted upon receipt of a first device readiness signal to indicate an increase in a number of frames the first device is ready to accept;
a readiness signal generator that is to send a first gateway readiness signal to the second gateway, the first gateway readiness signal is indicative of an increase in a number of frames the first gateway is ready to accept;
an input buffer that is to receive a first device frame from the second gateway and that is to send the first device frame to the first device when the first device readiness indicator indicates that the first device is ready to accept the first device frame; and
wherein the first device readiness indicator is to be adjusted, upon sending the first device frame to the first device, to indicate a decrease in the number of frames the first device is ready to accept.

21. The gateway of claim 20, wherein the first device readiness indicator is a counter that is incremented upon receipt of the first device readiness signal.

22. The gateway of claim 20, wherein the first device readiness indicator is a counter that is decremented upon sending the first device frame to the first device.

23. The gateway of claim 20, further comprising:
a readiness signal register that is to store a value; and
wherein the readiness signal generator is to retrieve the value stored in the readiness signal register and to generate a number of first gateway readiness signals based on the value stored in the signal register.

24. The gateway of claim 20, further comprising:
a readiness signal register that is to store a value indicative of a number of frames that the second gateway will accept; and
a gateway readiness indicator is to be loaded with the value stored in the readiness signal register.

25. The gateway of claim 20, further comprising:
a gateway readiness indicator that is to receive from the second gateway a second gateway readiness signal, the gateway readiness indicator upon receipt of the second gateway readiness signal is to be adjusted to indicate an increase in a number of frames the second gateway is ready to accept;
an output buffer that is to send a second device frame received from the first device to the second gateway; and
wherein the gateway readiness indicator is adjusted upon the sending of the second device frame to indicate a decrease in the number of frames the second gateway is ready to accept.

26. A first gateway for communication between a first device and a second device, the first gateway coupling the first device to an intermediate network to which the second device is coupled by way of a second gateway, the first gateway comprising:
a readiness signal generator that is to send a readiness signal to the first device;
output buffer that is to receive a second device frame from the first device in response to the readiness signal;
a second gateway readiness indicator that is to be adjusted upon receipt of a second gateway readiness signal from the second gateway to indicate an increase in a number of frames the second gateway is ready to accept;
wherein the output buffer is to send the second device frame to the second gateway when the second gateway readiness indicator indicates that the second gateway is ready to accept the second device frame; and
wherein the second gateway readiness indicator is to be adjusted upon sending the second device frame to the second gateway to indicate a decrease in the number of frames the second gateway is ready to accept.

27. The gateway of claim 26, further comprising:
a readiness signal register that stores a value indicative of a number of second device frames that the second gateway will accept; and
wherein the gateway readiness indicator is to be loaded with the value stored in the readiness signal register.

28. The gateway of claim 26, wherein the gateway readiness indicator is a counter that is to be incremented upon the receipt of the second gateway readiness signal.

29. The gateway of claim 26, wherein the gateway readiness indicator is a counter that is to be decremented upon sending the second device frame to the second gateway.

30. A first gateway for communication between a first device and a second device, the first gateway coupling the first device to an intermediate network to which the second device is coupled by way of a second gateway, the first gateway comprising:
a first device readiness indicator adjusts, upon receipt of a first device readiness signal from the first device, an indication of an increase in a number of frames the first device is ready to accept;
a readiness signal generator sends a first gateway readiness signal to the second gateway, the first gateway readiness signals indicative of an increase in a number of frames the first gateway is ready to accept;

an input buffer receives a first device frame from the second gateway and sends the first device frame to the first device if the first device readiness indicator indicates that the first device is ready to accept the first device frame; and wherein the first device readiness indicator is adjusted upon sending the first device frames to the first device to indicate a decrease in the number of frames the first device is ready to accept.

31. A first gateway for communication between a first device and a second device, the first gateway coupling the first device to an intermediate network to which the second device is coupled by way of a second gateway, the first gateway comprising:

a first device readiness indicator that is to be adjusted upon receipt of a first device readiness signal to indicate an increase in a number of frames the first device is ready to accept;

an input buffer that is to receive a first device frame from a second gateway and that is to send the first device frame to the first device when the first device readiness indicator indicates that the first device is ready to accept the first device frame;

a first readiness signal generator that is to send a first gateway readiness signal to the second gateway when free space in the input buffer is above a threshold;

a first gateway readiness indicator that is to be adjusted when the first device frame enters the input buffer to indicate a decrease in a number of frames the first gateway is ready to accept; and wherein the first device readiness indicator is to be adjusted, upon the sending of the first device frame to the first device, to indicate a decrease in the number of frames the first device is ready to accept.

32. The first gateway of claim 31, further comprising:

a second readiness signal generator that is to send first gateway readiness signals to a second gateway, the first gateway readiness signals indicative of a number of frames the first gateway is ready to accept; and wherein the first gateway readiness indicator is adjusted when the first gateway readiness signals are sent to the second gateway to indicate an increase in the number of frames the first gateway is ready to accept.

33. The first gateway of claim 31, further comprising:

a readiness signal register that stores a value indicative of a number of first device frames that the first gateway will accept; and wherein the first gateway readiness indicator is to be loaded with the value stored in the readiness signal register.

34. The first gateway of claim 31, wherein the first gateway readiness indicator is a counter that is to be incremented upon receipt of the first gateway readiness signals.

35. The gateway of claim 31, wherein the first gateway readiness indicator is a counter that is to be decremented upon receipt of one of the first device frames.

36. The first gateway of claim 31, wherein the first readiness signal generator is to store the first gateway readiness signal for later transmittal to the second gateway, when free space in the input buffer is below a threshold and the first device frame leaves the input buffer.

37. The first gateway of claim 31, wherein the first readiness signal generator is to send the first gateway readiness signal to the second gateway, when free space in the input buffer is above a threshold and the first device frame enters the input buffer.

* * * * *